May 25, 1965  C. G. WILSON, SR  3,185,143
SPACE HEATER
Filed Oct. 18, 1963  2 Sheets-Sheet 2
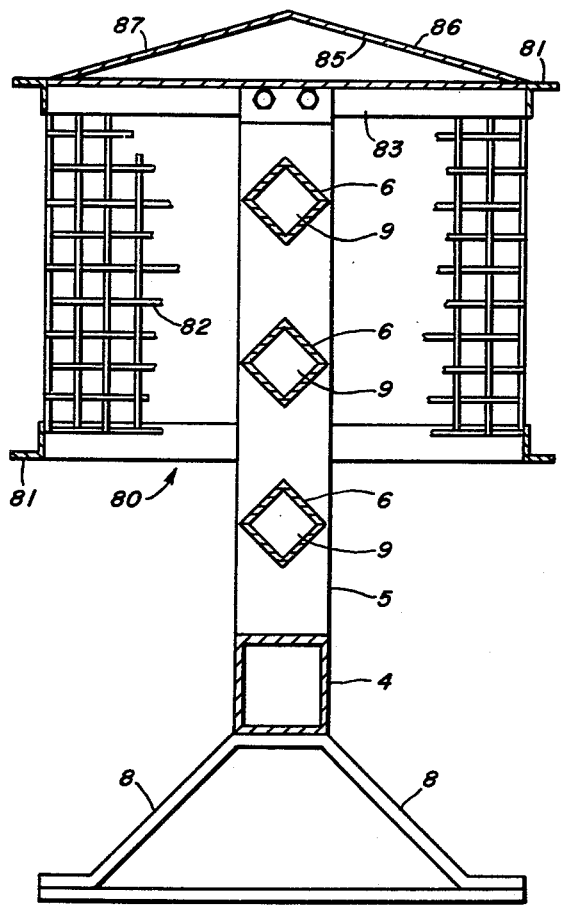
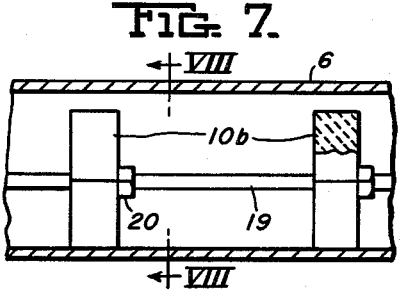
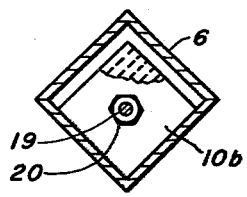
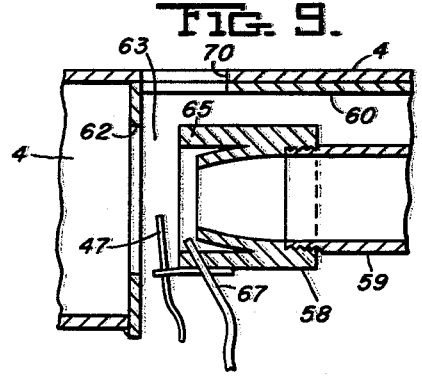
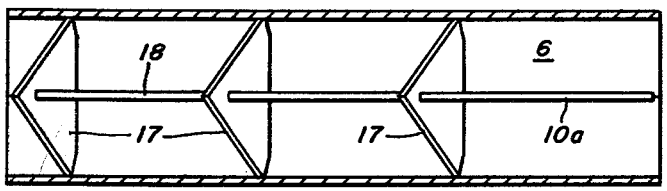
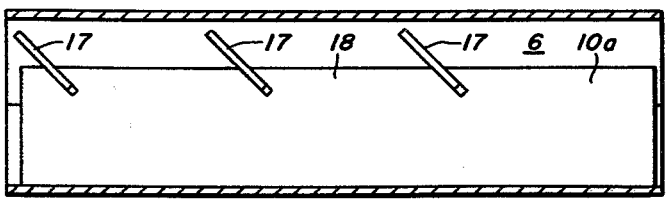
INVENTOR.
CHARLES G. WILSON, SR.
By Donald G. Dalton
Attorney United States Patent Office 3,185,143
Patented May 25, 1965

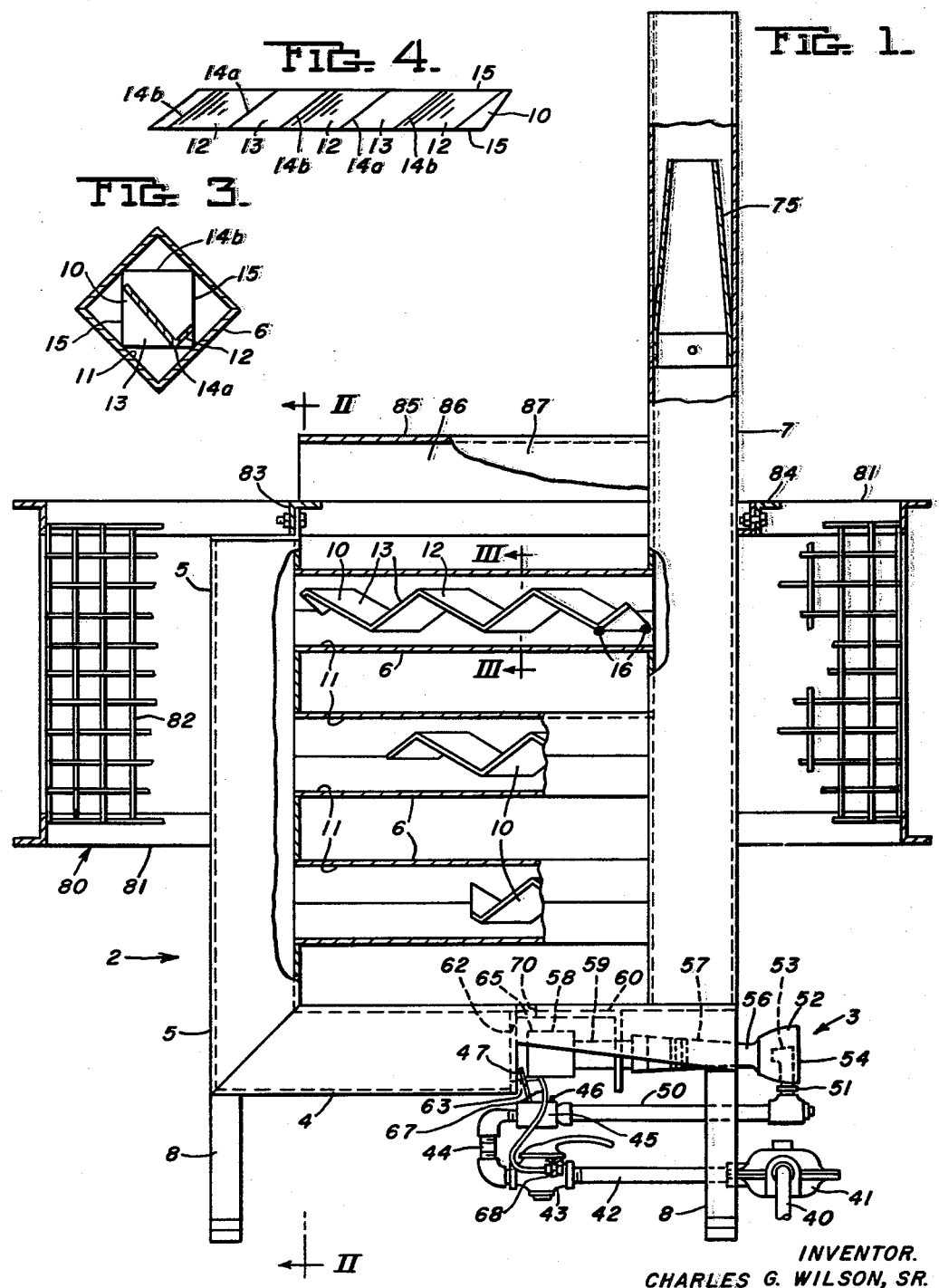

3,185,143
SPACE HEATER
Charles G. Wilson, Sr., McKeesport, Pa., assignor to United States Steel Corporation, a corporation of New Jersey
Filed Oct. 18, 1963, Ser. No. 317,250
2 Claims. (Cl. 126—91)

This invention relates to a space heater for heating an outdoor work area, or a work station within a large factory or mill building. Such heaters are commonly used in large plants where it is not economical to adequately heat the entire plant in the wintertime, and the workmen or equipment in the plant would be subjected to uncomfortably low temperatures were it not for the use of local heating units.

A requirement of these heaters is that they be of a low-cost, simple construction. In addition, they must be sturdy enough to withstand heavy mill use over a long service life.

One object of my invention is to provide a reliable space heater that will meet these requirements and will completely satisfy the heating needs of the industrial workman.

Another object of my invention is to provide a space heater that will operate at a high thermal efficiency and direct its heat primarily toward the place where it is most needed, namely the space laterally surrounding the heater where workmen or equipment would be located, rather than for instance, towards the space above the heater.

A further object of my invention is to provide a space heater that will maintain its entire radiant surface at a uniform temperature, in order to effect a more even heat distribution to the space surrounding the heater.

The attainment of these and other objects by my invention will appear more readily from the following detailed description of a preferred embodiment thereof shown in the attached drawings in which:

FIGURE 1 is a side elevation of a space heater with portions thereof broken away;

FIGURE 2 is a sectional view of the space heater of FIGURE 1, taken through line II—II of FIGURE 1;

FIGURE 3 is an enlarged sectional view of a baffle and radiant tube of the space heater of FIGURE 1, taken on line III—III of FIGURE 1;

FIGURE 4 is a top view of one of the baffles in the space heater of FIGURE 1;

FIGURE 5 is a side view of another form of baffle for use in the space heater of FIGURE 1;

FIGURE 6 is a top view of the baffle of FIGURE 5;

FIGURE 7 is a side view of yet another form of baffle for use in the space heater of FIGURE 1;

FIGURE 8 is a sectional view of the baffle of FIGURE 7, taken through lines VIII—VIII;

FIGURE 9 is an enlarged sectional view of the nozzle and part of the manifold of the space heater of FIGURE 1.

Referring to the embodiment of FIGURE 1, the space heater 2 comprises a burner system 3, a horizontal manifold 4, a vertical header 5, horizontal radiant tubes 6, and a vertical exhaust stack 7. The heater 2 is supported on pairs of legs 8 welded to the bottom of the manifold 4 near each end of the heater. Legs 8 may be seen best in FIGURE 2.

The radiant tubes 6 form the principal area from which heat radiates from the heater 2. These tubes are of generally rectangular or square cross-section, as seen in FIGURE 3, and are preferably made of structural-steel tubing. These rectangular tubes causes more desired turbulence in the gases than is experienced with cylindrical tubes. Each radiant tube 6 should be oriented with one diagonal of its rectangular cross-section horizontal so that the tube 6 has as much surface area as possible facing the space and the side of the heater.

Although there are three radiant tubes 6 in the embodiment of the heater shown in FIGURE 1, any number may be used depending on the size and shape of the space to be heated. Only a single radiant tube may be sufficient. When more than one is used, the tubes 6 should be stacked one above the other between header 5 and exhaust stack 7, as shown in FIGURE 1. The tubes 6 are welded to both the header and the stack and communicate with appropriate rectangular openings 9 in the header 5 (FIGURE 2) and similar openings in the stack 7.

The header 5, exhaust stack 7, and manifold 4 are also preferably made of structural-steel tubing. The manifold 4 communicates with the bottom end of the header 5 and is welded to both the header 5 and exhaust stack 7. The bottom end of exhaust stack 7 is closed off by the top wall of the manifold 4.

Baffles 10, provided inside tubes 6, perform two functions. First, they act as dampers on the hot combustion gases passing through each tube 6, and they are used to control the flow of these gases. Second, they increase the turbulence of the combustion gases in the radiant tubes. By limiting the flow of the gases through the tubes 6 and increasing the turbulence of these gases, baffles 10 cause a greater rate of heat transfer from the gases to the radiant tubes 6, thus raising the efficiency of the heater.

In the embodiment of FIGURE 1, baffles 10 are made of metal, preferably a metal such as stainless steel which has high strength at high temperatures and a high corrosion resistance to the hot combustion gases flowing through the radiant tubes.

These baffles are of a zig-zag shape and consist of inclined plates 12 and 13, joined at lower bends 14a and upper bends 14b in the baffle. It is preferred that each baffle 10 be disposed in its radiant tube 6 with its longitudinal edges 15 in substantially vertical planes. The bends 14a and 14b should be at acute angles to the vertical planes defined by the edges 15 of the baffle, as seen in the top view of the baffle in FIGURE 4. The inclined plates 12 and 13 may be of different lengths, or the same length.

The baffles 10 are oriented with respect to the walls of radiant tubes 6 in the manner shown in FIGURE 3. The plates 12 and 13 of the baffles are inclined to interrupt the flow of gases in the radiant tubes 6 and to cause these gases to wash against the walls 11 of the tubes. Baffles 10 are held in position by tack welds 16 at the ends of the tubes 6 adjoining the exhaust stack 7 (FIGURE 1).

Another form of baffle that has been found to perform as well as baffles 10 is shown in FIGURES 5 and 6. The baffle 10a is composed of a series of inclined plates 17 mounted on a vertical base plate 18. The inclined plates 17 perform the same function as the plates 12 and 13 of baffle 10, causing the gases in radiant tubes 6 to wash against the walls 11 of the tubes. Base plate 18 is designed to be tack welded to the bottom corner of a rectangular radiant tube 6.

Still another form of baffle that may be used is a series of ceramic deflecting plates, such as plates 10b shown in FIGURES 7 and 8. These plates are mounted perpendicular to the flow of combustion gases and are slightly smaller than the interior cross-section of the tubes 6 to permit the gases to flow therearound. Ceramic plates 10b are spaced at intervals along the lengths of the radiant tubes by metal rods 19 equipped with bolts 20 (FIGURE 7). Bolts 20 keep plates 10b from sliding axially along the rods 19 while they are being inserted into the tubes 6 during assembly of the heater 2. Ceramic plates 10b perform well in operation. They will withstand high temperatures, and they will not be corroded by the hot combustion gases.

In a space heater with more than one radiant tube, there would ordinarily be a tendency for most of the hot gases to rise to the top of the header 5 and flow into the upper rather than the lower radiant tubes. The upper tubes would thus be hotter than the lower tubes. To solve this problem, the sizes of the baffles in the radiant tubes 6 are varied to obtain a more uniform gas flow through these tubes. With the baffle 10 shown in the embodiment in FIGURE 1, this size variation is accomplished merely by changing the lengths of the baffles. The baffle in the lowest radiant tube is the shortest and the baffles are progressively longer in the upper radiant tubes. When baffles 10a in FIGURES 5 and 6 are used, the heights of plates 17 may be varied, instead of the lengths of the baffles. The shortest plates 17 will be in the lowest radiant tube and plates 17 will be progressively taller in the upper radiant tubes. Likewise, ceramic plates 10b are made progressively larger in the upper radiant tubes. With the foregoing baffling arrangements, the radiant tubes can be evenly heated to a substantially uniform temperature from top to bottom. The tendency of the hot gases to rise to the upper radiant tubes will be counteracted by the increased flow resistance provided by the increased baffle area in the upper tubes.

Since the baffles 10 in FIGURE 1 are of varying lengths and each baffle is tack welded to the end of its radiant tube adjacent the exhaust stack 7, they will project varying distances toward the header ends of the radiant tubes. This is shown in the cut-away portions of the radiant tubes in FIGURE 1. In a space heater with three radiant tubes, each 24½ inches long, the lengths of the baffles should be about 12 inches in the bottom tube, 18 inches in the middle tube, and 24 inches in the top tube. With baffles 10a, the heights of plates 17 (FIGURE 5) in three radiant tubes, each having a 3½ inch square cross-section, should be about 2⅛ inches in the bottom tube, 2½ inches in the middle tube, and 3⅛ inches in the top tube. Plates 17 should be spaced about 6 inches apart and mounted at approximately 45° angles to the horizontal. With all types of baffles, care should be taken that none extend into the exhaust stack 7, as this condition has been found to lower the efficiency of the heater.

The burner system 3 is located at the bottom of the space heater in FIGURE 1. Liquid or gas fuel enters through a supply pipe 40, passes through regulator 41 and into pipe 42. A hand operated fuel cock 43 is connected to pipe 42 for controlling the flow of fuel through the system. From cock 43, the fuel flows through pipe 44 to a pilotstat 45. Pressing pushbutton 46 on the pilotstat permits the fuel to flow through the pilotstat. Pilotstat 45 is also controlled by a thermocouple 47, and when the thermocouple is heated sufficiently, the pilotstat will remain open without pressing on pushbutton 46.

The fuel flows from pilotstat 45 through pipe 50 to fuel inlet 51 of the fuel-air mixer head 52. From inlet 51, the fuel is directed through orifice 53 in mixer head 52. Air is taken into the mixer head 52 through primary air inlet 54, which has a fixed cross-sectional area. This air is induced by the high velocity fuel flowing from the orifice 53 into the throat of a venturi tube 56. The fuel and air are mixed in mixing chamber 57 and then flow into the burner nozzle 58 through a nipple 59 mounted in a bracket 60, best seen in FIGURE 9. Bracket 60 is in turn welded to the manifold 4 and has an orifice 62 immediately in front of the burner nozzle 58.

The space between the burner nozzle 58 and orifice 62 forms a secondary air inlet 63 (FIGURE 9). This inlet allows passage of additional air necessary for complete combustion and the optimum fuel-air ratio is obtained by varying the size of secondary air inlet 63. Nozzle 58 is equipped with a flame-retaining ring 65, shown in section in FIGURE 9. The thermocouple 47 which controls pilotstat 45 is mounted on nozzle 58 and protrudes into secondary air inlet 63.

Inserted in flame-retaining ring 65 of nozzle 58 is a pilot fuel tube 67. Tube 67 is connected to pilot valve 68, which is mounted on and communicates with the inlet side of fuel cock 43. For igniting the burner, an ignition opening 70 is provided in the top walls of manifold 4 and bracket 60 above secondary air inlet 63. Turning on pilot valve 68 and inserting a torch through ignition opening 70 ignites the burner. If desired, a constantly burning pilot may be provided near opening 70 to obviate the need for a torch. The main flame of the burner is produced by opening fuel cock 43 and depressing pushbutton 46 on pilotstat 45. Once thermocouple 47 is heated sufficiently by the main flame, pushbutton 46 on pilotstat 45 may be released. The pilotstat will remain open as long as the main flame is retained.

A safety screen 80, shown in FIGURES 1 and 2, should be provided to prevent contact with the radiant tubes, the header, or the stack of the heater. The safety screen 80 comprises a frame 81, wire meshing 82, and support bars 83 and 84. Bars 83 and 84 are bolted to the top of header 5 and the side of exhaust stack 7, respectively. A heat reflector 85, consisting of inclined plates 86 and 87, may be welded to the top of frame 81 directly above the radiant tubes 6 of the space heater. Reflector 85 directs vertically radiated heat to the space surrounding the heater.

The operation of the space heater 2 may be briefly summarized as follows:

The burner system 3 is started up in the manner hereinbefore described. A main flame is thus produced, emanating from burner nozzle 58 and extending into manifold 4. The combustion gases produced in manifold 4 flow upwards into vertical header 5. From the header 5, the gases are distributed to the rectangular radiant tubes 6, where they become subjected to a highly turbulent flow, caused by the rectangular shape of the radiant tubes 6 and by the baffles 10 in the radiant tubes. The gases are washed by the baffles 10 against the walls 11 of tubes 6, causing a heat transfer from the gases to the walls. The walls 11 radiate this heat outwardly into the space laterally surrounding the heater. Heat radiating towards the space above the heater may be deflected to the side of the heater by reflector 85. After losing most of their heat to the walls of the radiant tubes, the combustion gases flow into the vertical exhaust stack 7 and then upwards to the atmosphere.

While I have thus shown and described my invention, various changes and modifications may occur to those skilled in the art without departing from the scope of the appended claims.

I claim:

1. A space heater comprising the combination with a horizontal manifold, a fuel burner firing into one end thereof, a vertical header communicating with the other end of said manifold for conveying combustion gases upwardly therefrom, a horizontal radiant tube of substantially rectangular cross-section communicating at one end with said header and receiving said combustion gases therefrom, a vertical exhaust stack communicating with said radiant tube at the other end of said tube, a baffle within said radiant tube comprising a series of deflecting plates each disposed at an angle to the flow of gases through said tube to promote turbulent flow, whereby said radiant tube absorbs heat from said gases undergoing turbulent flow and radiates it outwardly therefrom, said tube being disposed with one diagonal of its rectangular cross-section substantially horizontal for maximum heat radiation to the space laterally surrounding said heater, additional horizontal radiant tubes stacked above said first mentioned tube, and baffles in all of said last named radiant tubes, the lengths of said baffles increasing progressively from the bottom tube to the top tube.

2. A space heater comprising the combination with a horizontal manifold, a fuel burner firing into one end thereof, a vertical header communicating with the other end of said manifold for conveying combustion gases upwardly therefrom, a horizontal radiant tube of substantially rectangular cross-section communicating at one end with said header and receiving said combustion gases therefrom, a vertical exhaust stack communicating with said radiant tube at the other end of said tube, a baffle within said radiant tube comprising a series of deflecting plates each disposed at an angle to the flow of gases through said tube to promote turbulent flow, whereby said radiant tube absorbs heat from said gases undergoing turbulent flow and radiates it outwardly therefrom, said tube being disposed with one diagonal of its rectangular cross-section substantially horizontal for maximum heat radiation to the space laterally surrounding said heater, additional horizontal radiant tubes stacked above said first mentioned tube, and baffles in all of said last named radiant tubes having deflecting plates the sizes of which increase progressively from the bottom tube to the top tube.

References Cited by the Examiner

UNITED STATES PATENTS

| | | |
|---|---|---|
| 287,258 | 10/83 | Egnor. |
| 768,785 | 8/04 | Bayles _____ 126—91 |
| 1,685,870 | 10/28 | Shuell et al. _____ 126—91 |
| 2,368,177 | 1/45 | Turpin _____ 126—360 |
| 2,759,472 | 8/56 | Cartter _____ 126—91 |
| 2,941,525 | 6/60 | Harshfield. |

JAMES W. WESTHAVER, *Primary Examiner.*

FREDERICK KETTERER, *Examiner.*

UNITED STATES PATENT OFFICE
CERTIFICATE OF CORRECTION

Patent No. 3,185,143                        May 25, 1965

Charles G. Wilson, Sr.

It is hereby certified that error appears in the above numbered patent requiring correction and that the said Letters Patent should read as corrected below.

In the drawings, Sheet 1, Fig. 1, the showing of the eductor 75 in exhaust stack 7 should be eliminated.

Signed and sealed this 5th day of October 1965.

(SEAL)
Attest:

ERNEST W. SWIDER                      EDWARD J. BRENNER
Attesting Officer                       Commissioner of Patents